United States Patent Office 3,391,423
Patented July 9, 1968

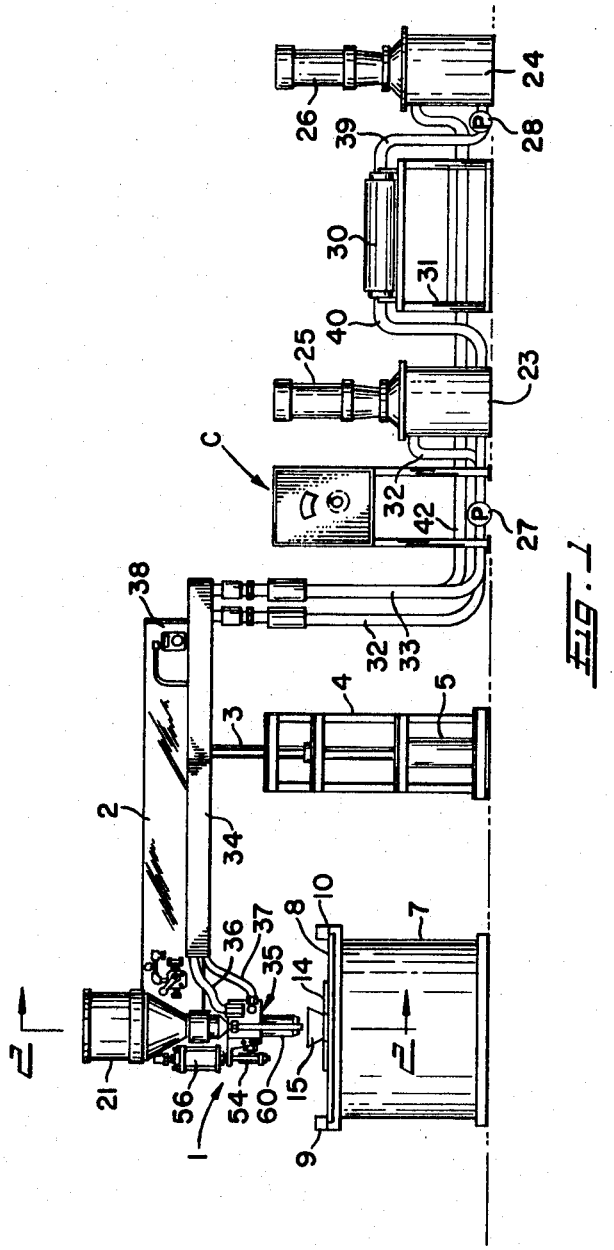

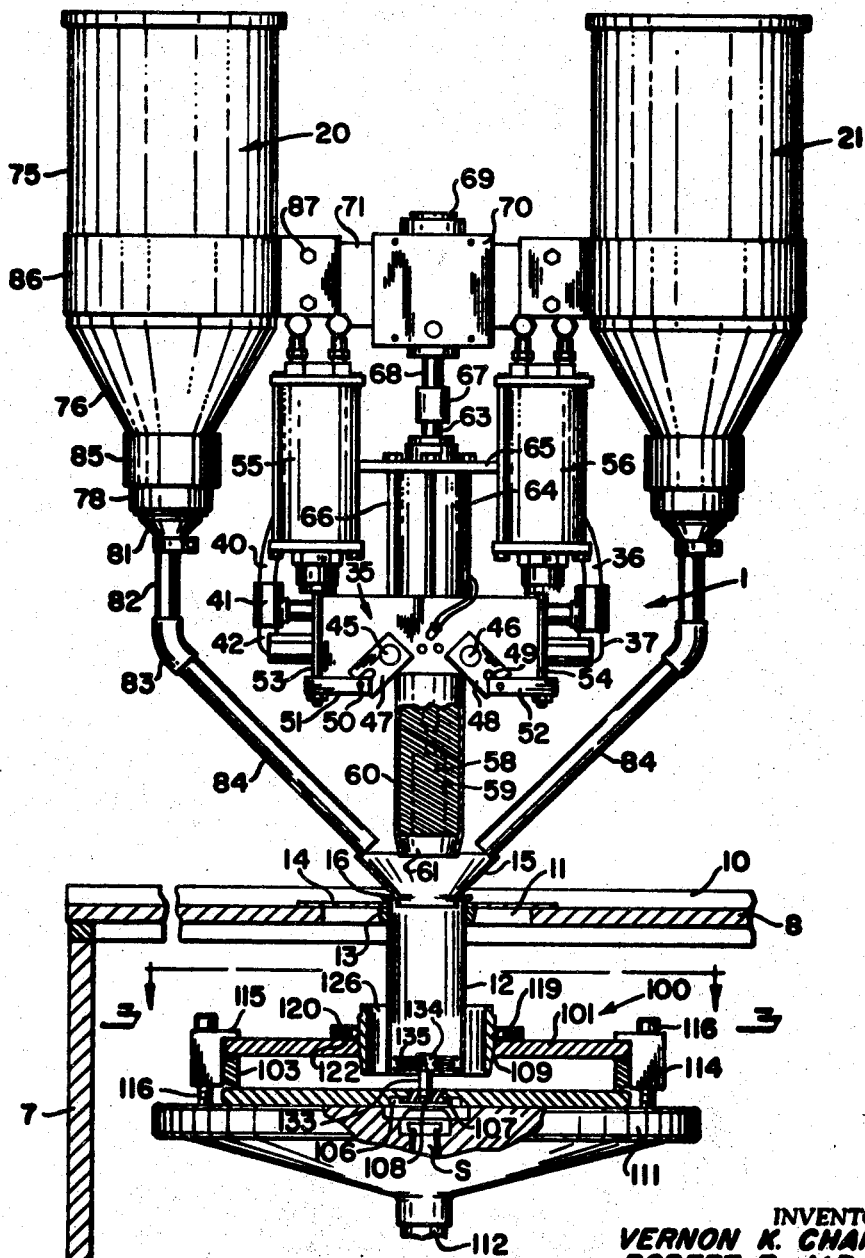

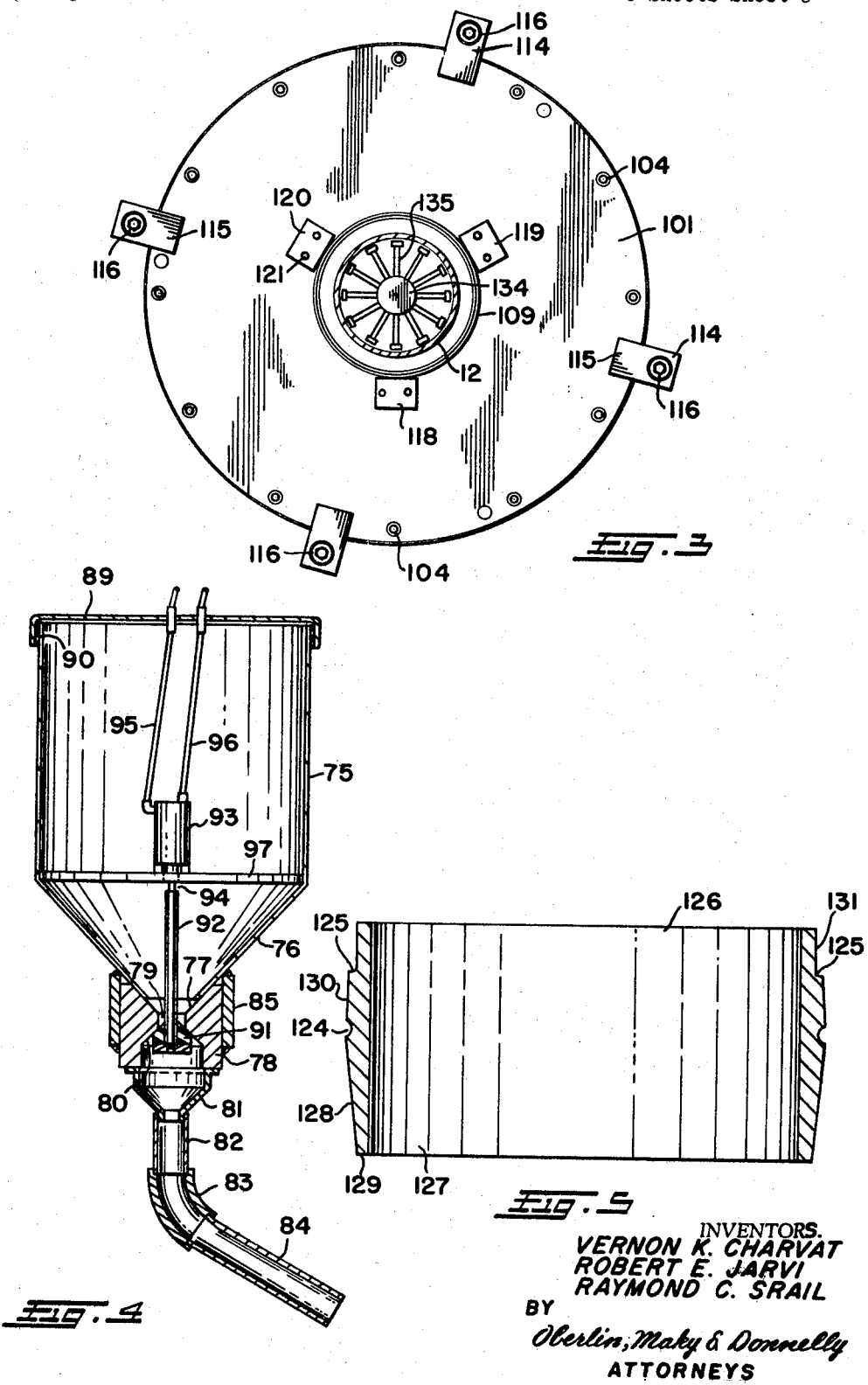

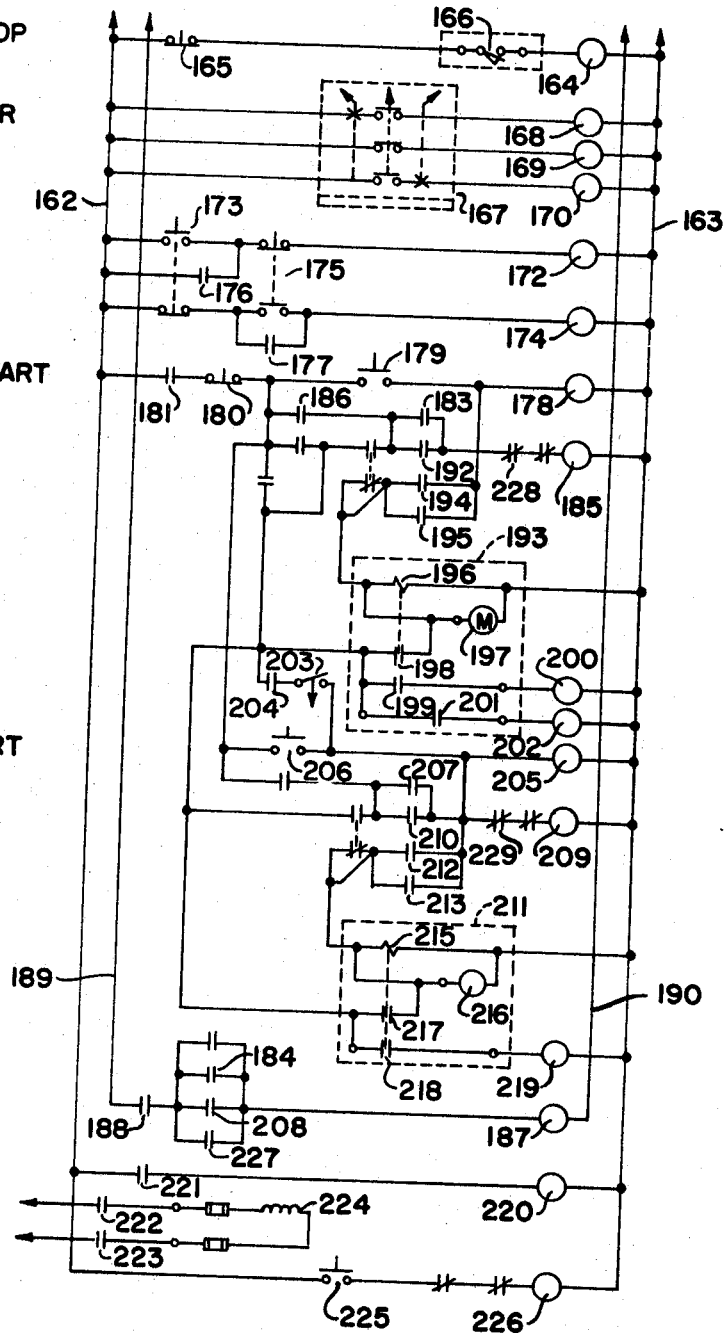

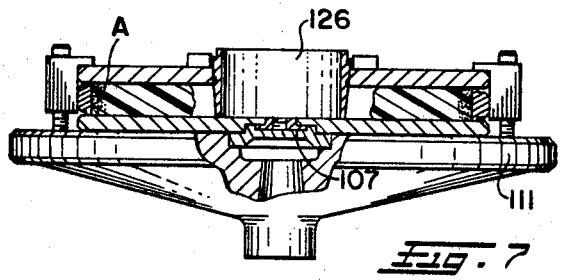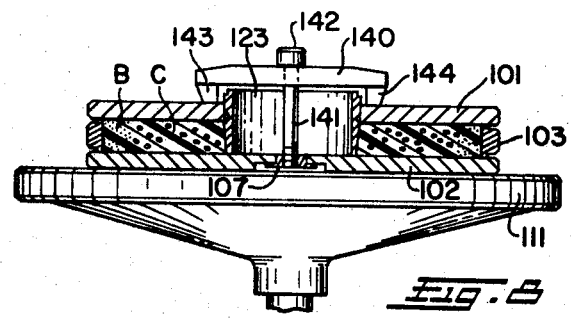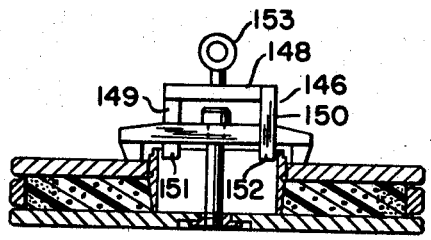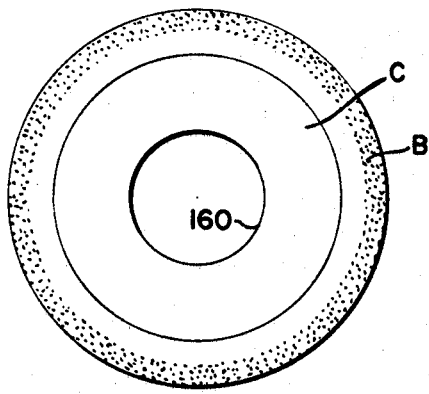
INVENTORS.
VERNON K. CHARVAT
ROBERT E. JARVI
RAYMOND C. SRAIL
BY
Oberlin, Maky & Donnelly
ATTORNEYS

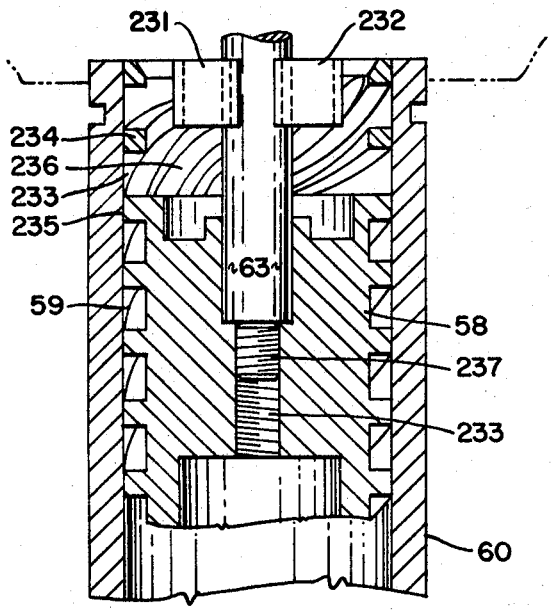
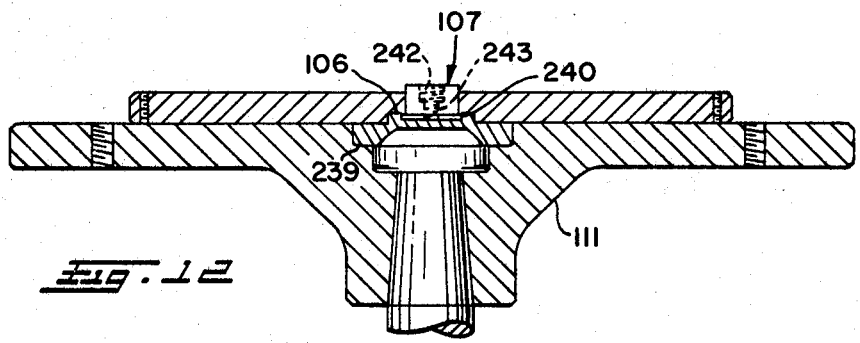
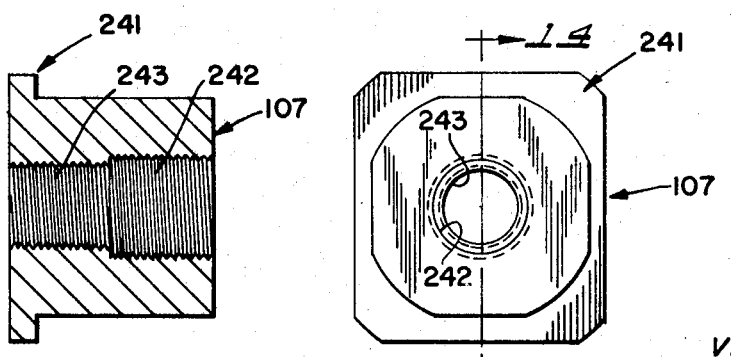

3,391,423
APPARATUS FOR MAKING ABRASIVE ARTICLES
Vernon K. Charvat, Bay Village, Robert E. Jarvi, Judson, and Raymond C. Srail, Cleveland, Ohio, assignors to The Osborn Manufacturing Company, Cleveland, Ohio, a corporation of Ohio
Filed Aug. 7, 1964, Ser. No. 388,177
26 Claims. (Cl. 18—5)

ABSTRACT OF THE DISCLOSURE

Apparatus for making abrasive articles such as grinding wheels which includes a resin dispenser and an associated abrasive grain dispenser adapted to fill a rotatable annular mold through a fill passageway extending into a central opening of the mold, a mixer mounted in the lower end of the fill passageway including mixing elements sweeping the discharge end of the passageway, and a filling cup for the mold releasably held in a mold open or mold closed position, the latter providing a mold having a substantial open center core.

---

This invention relates generally, as indicated, to apparatus for making abrasive articles and particularly to apparatus for making plastic bonded grinding wheels. More particularly, this invention relates to certain improvements in apparatus for making abrading tools of the type disclosed in copending application, Ser. No. 304,002, filed Aug. 23, 1963, entitled, "Abrading Tools."

In such application there are disclosed certain remarkable abrasive tools and more particularly grinding wheels which are capable of abrasive machining and a new order of grinding efficiency thus making available substantial economies in metal cutting and stock removal work. With such wheel it is possible to make deep precise cuts into metal workpieces and the like utilizing higher working pressures and faster tool speeds. Some advantages in using such wheel in the above manner are greater stock removal per pass, better surface finish, superior accuracy and greater freedom from metallurgical damage. In this manner, production operations such as primary roughing cuts can be combined or omitted frequently or reduced in number thus increasing the production rate significantly. A metal removal process involving many types of machines and numerous setups of the workpiece can often be accomplished with such wheel on a grinder in one setup while getting the finished part requirements simultaneously of dimensional accuracy, fine finish, and freedom from metallurgical damage.

The wheel itself comprises abrasive grains uniformly slightly spaced apart and yet concentrated about the periphery thereof in an essentially rigid yet non-brittle resin to afford a large number of cutting points exposed at the working face in a structural relationship capable of stress absorption and distribution. Such cutting points or abrasive grains are, by virtue of their spacing and the type and amount of bond present in the structure, slightly individually adjustable under such working pressures imposed thereon. The capacity for micro-movement of abrasive grains which results in the absorption and distribution of impact and energy loads associated with grinding protects the grain from destructive forces which dull them rapidly and/or prematurely break them from the face of the wheel.

Conventional wheels ordinarily comprise a mass of densely compacted discrete abrasive grains bonded together by a pressure molded and fired ceramic material or a pressure molded and heat cured resin bonding agent. The manufacture of such grinding wheel requires great skill in the proper mixing of the grain and bonding agent and proper application of pressure to the mold. The grinding wheel then requires very lengthy baking and curing periods properly to be fired. Conventional grinding wheels are quite fragile or brittle and easily fracture if not properly handled. For example, to drop a conventional vitrified or resin bonded grinding wheel on the floor would generally damage the wheel beyond use. Conventional abrasive wheels are made as a compromise between wheel strength and ability to perform a specific job. According to the "Foreword" section of the American Standard Safety Code for the Use, Care and Protection of Abrasive Wheels (B7, 1–1964, February 12, 1964), the theory is explained as follows:

"The strength of an abrasive wheel is always limited by the operation it is designed to perform, for as the outer abrasive layer becomes dull from grinding, the dull grains must break free, exposing new cutting edges. This action must be progressive and continuous. Wheels of greater strength than required by the stresses set up on any particular grinding operation will not grind properly for they will not release the dull grains."

Therefore, conventional wheel theory indicates that strength must be sacrificed in order to avoid undesirable traits of dull grained wheels such as chatter, loss of efficient cutting action and metallurgical damage. As a result, the conventional wheels are made quite brittle and fragile and of a strength suitable for the particular job of grinding.

This is not a limitation with subject wheel produced by the method and apparatus of this invention. In the production of grinding wheels from raw materials such as a foamable polyurethane reaction mixture, the abrasive must be thoroughly mixed with the polyurethane constituent in a very short time in a sequence that not only assures the very important step of thoroughly wetting the abrasive with the plastic reactants but also enables better control of the following steps which link processing variables to the reactivity and foaming rate of the polyurethane-abrasive system. By better controlling the production steps in this manner, it is easier to obtain the grinding wheel structure desired in cycle after cycle. Heretofore, manual mixing of the resin ingredients and the abrasive has sufficed for the production of relatively small grinding wheels and, depending upon the volume of ingredients handled, does not always provide the uniformity and quality desired in such wheels nor adherence to the volumetric specifications. Also, the time consumed in manual mixing made it extremely difficult to mix and handle large quantities of grinding wheel raw materials in a very short time (i.e., about 220 pounds of materials in less than 120 seconds for a 24" O.D. x 8" thick wheel). Thus the intimate mixing of the resin reactant materials and the abrasive materials is difficult to accomplish and control in a very short period of time in a sequential order during the manufacturing cycle.

Also, it is difficult to close internally a cylindrical mold at the proper time so that the wheel might be cored at the desired diameter thus producing a raw material savings while allowing free and low pressure venting of excess gas and defining the final dimensions of the mold. Also, this internal apparatus should desirably close the mold "on the fly" thus losing no time in the operation, which is an important factor, especially with large volume highly reactive mixes.

It is accordingly a principal object of the present invention to provide a unique apparatus for producing grinding wheels of the type disclosed in the aforementioned copending application.

A further principal object is the provision of apparatus for making grinding wheels wherein the abrasive grains are effectively thoroughly intimately intermixed with the resin constituents in a short period of time within the wheel mold and associated apparatus.

Another important object is the provision of apparatus for making relatively large grinding wheels in a very short period of time.

Still another object is the provision of the combination of apparatus for making grinding wheels and a grinding wheel mold wherein the mold can be closed without stopping the manufacturing process.

A further object is the provision of a rotating mold for grinding wheels and the like wherein the abrasive and resin constituents are intimately intermixed by the rotation of the mold itself.

Another object is the provision of a rotating mold for grinding wheels and the like wherein the abrasive and resin are intimately intermixed by an apparatus rotating at a different speed than that of the mold itself. By this process the wheel constituents can be mixed at one speed and the mixed constituents distributed in the mold at another speed.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a somewhat schematic side elevation of apparatus in accordance with the present invention for making grinding wheels;

FIG. 2 is an enlarged fragmentary vertical section taken substantially on the line 2—2 of FIG. 1;

FIG. 3 is an enlarged horizontal section taken substantially on the line 3—3 of FIG. 2 illustrating the mold and mixing apparatus of the present invention;

FIG. 4 is an enlarged vertical section taken on the line 2—2 of FIG. 1 showing the details of one of the abrasive supply hoppers;

FIG. 5 is an enlarged diametral section of the center filling cup;

FIG. 6 is a schematic wiring diagram illustrating more clearly the various steps in the cycle of the production of grinding wheels;

FIG. 7 is a vertical section of the mold during centrifuging with the filling cup closing the same;

FIG. 8 is a section similar to FIG. 7 illustrating resin constituents foaming expanding the abrasive ring of the wheel and with the mold spanner bar in place;

FIG. 9 is a section similar to FIG. 8 illustrating the mold being removed from the apparatus;

FIG. 10 is an axial elevation of the wheel thus produced;

FIG. 11 is a detailed section of the impeller and impeller housing illustrating the metering ports and connection of the impeller with the drive shaft;

FIG. 12 is a section of the centrifuge table and mold bottom illustrating the method of centering the mold by the use of a mold locating pilot;

FIG. 13 is a top plan view of the mold insert; and

FIG. 14 is a sectional view of such insert illustrating the two tapped apertures which perform separate functions during the various stages of processing.

Referring now to the annexed drawings and more particularly to FIG. 1, there is illustrated apparatus in accordance with the present invention for the production of abrasive tools and more particularly for the production of grinding wheels. Such apparatus includes a mixing head 1 which is mounted on the outer end of a horizontally disposed support frame or bead 2 which is in turn supported on post 3 for horizontal swinging movement about the vertical axis thereof. The post is supported in a frame 4 and a piston-cylinder assembly 5 may be provided in the lower part of the frame 4 supporting the post 3 for vertical movement within the frame 4. In this manner, the frame 2 is mounted for horizontal swinging movement about the axis of the post 3 and such frame may also be raised and lowered at the direction of the piston-cylinder assembly 5.

A cylindrical centrifuge housing 7 is provided directly beneath the mixing head 1 and includes a sliding cover 8 mounted on gibs 9 and 10 on the top of the housing 7. As seen in FIG. 2, the cover 8 is provided with a central fill opening 11 and a fill tube 12 may be supported centrally in such opening by means of hub 13 secured thereto which is mounted on spider 14 supported on the cover 8. A funnel 15 is supported on the top of the fill tube 12 by means of a support ring 16 and the entire fill tube and funnel assembly including the spider may be manually inserted and removed from the fill opening 11 in the cover 8.

It can now be seen that the mixing head 1 is mounted for movement into a position directly above the funnel 15 for application of the grinding wheel constituents thereto.

The grinding wheel constituents comprise a granular abrasive material which may be contained within hoppers 20 and 21 mounted on the end of the frame 2 adjacent the mixing head 1, and resin components which may be contained within tanks 23 and 24. In the illustrated embodiment, the preferred resin is a foamable polyurethane.

The tank 23, for example, may contain the hydroxyl rich resin such as a polyester or polyether which may contain catalyst to control the reactivity of the system, water to determine the amount of $CO_2$ generated in blowing the foam, cell control agents to obtain the desired cell structure and fillers which may be necessary to produce the desired abrasive wheel properties.

Tank 24 may contain a prepolymer or polyisocyanate such as toluene diisocyanate which may contain thickeners such as ethyl cellulose, and fillers necessary to produce the desired abrasive wheel properties. Tank 24 may also contain a blowing agent such as a fluorinated hydrocarbon if the foam is to be generated in this manner.

Such tanks contain mixers 25 and 26 respectively which function to keep a uniform dispersion of ingredients and maintain a more uniform temperature condition throughout the tank. Metering pumps 27 and 28, shown schematically, may be provided to draw the materials from the respective tanks 23 and 24 to circulate the same through the mixing head 1 at a constant rate. Chilling unit 30 is provided on stand 31 to maintain the prepolymer or polyisocyanate at a desired constant temperature usually in the range of 60–80° F. Besides controlling at a constant temperature, the chiller could be used to keep this component cold enough to maintain the fluorinated hydrocarbon which may be added as a blowing agent well below its boiling point.

Electrically heated flexible hose lines 32 and 33 connect the tank 23 to heated pipe lines contained in heated coil 34 which in turn are connected to mixing head valve 35. The pump 27 maintains constant flow through the system drawing the fluid from the tank 23, pumping the same through flexible electrically heated line 33, through pipe contained in heated coil 34 and through line 36 into the mixing head valve 35. When valve 35 is in a recirculate position, the fluid will pass back through line 37 into a pipe contained in heated coil 34 and back through flexible electrically heated line 32 to the tank 23. Lines 32 and 33 have integral electrical resistance heating elements embedded in the elastomeric material of the hose. These elements accomplish the bulk of the heating and are controlled by central heating control unit shown schematically at C. Heated coil 34 which may comprise electrical resistance elements wrapped around the metal pipes leading to and from mixing valve 35 may be controlled by thermostats 38 or the like to maintain the temperature determined by the heated hose control. Since the temperature of the constituents affects the viscosity, it is required to maintain the temperature at precisely that which will obtain the desired viscosity. The viscosity must be such that there is no great disparity between the contents in tank 23 and those in tank 24. That is, it is most feasible to blend materials of reasonably similar viscosities.

Therefore, for example, a resin of 150,000 centipoise viscosity at 70° F. is reduced to 15,000 centipoise by heating to 125° F. while the polyisocyanate or prepolymer component is thickened and/or filled at a running temperature of 60–80° F. to reach a viscosity of 1000–7000 centipoise. Sometime, in the case of highly filled systems, the readings will be an indication of pseudoplasticity rather than true viscosity. Blending of the two components of similar viscosities ensures better compatibility and uniformity during the blending operation through the mixing head. Control of viscosity before blending has important considerations in the processing succeeding the initial mixing operation of components in tanks 23 and 24. For instance, the viscosity of the blended plastic components must be such that rapid wetting and mixing of adbrasive with the liquid can be accomplished in the step immediately following. In a later step in the process, the abrasive grains must be centrifuged through the reacting plastic materials, the rate of movement of the grain under the force of centrifuging being opposed by the viscosity of the liquid components.

The prepolymer or polyisocyanate component in tank 24 passes from the tank 24 through the pump 28 into line 39 connected to the chiller unit 30 and from the chiller unit 30 passes into line 40 which extends upwardly to the frame 2 to pass therealong and then into the mixing valve 35 through the connection indicated generally at 41 in FIG. 2. If the valve 35 is in the recirculate condition, the prepolymer or polyisocyanate component will simply be circulated through the line 42 back to the tank 24. These lines 32, 33, 40 and 42, may be flexible hoses so that the frame 2 can be elevated by the piston-cylinder assembly 5 or swung about its post axis 3 without disturbing the fluid connections.

It will be seen that the reactive resin constituents are circulated from the storage tanks 23 and 24 to the mixing head valve 35 through the heater units 32, 33, and 34 and chiller unit 30 which maintain the respective constituents at the desired temperature.

The mixing head valve 35 as seen more clearly in FIG. 2 may be generally of a conventional variety. Such valve includes a valve block 44 having two rotatable parallel valve members 45 and 46 therein which in the position shown will cause the resin constituents to circulate back to the respective tanks. Actuators 47 and 48 are mounted on the valve members 45 and 46, respectively, and such valve actuators are provided with longitudinally extending slots 49 in the distal ends thereof accommodating pins 50 which extend between the legs of U-shape members 51 and 52 which are secured to the ends of rods 53 and 54 of pneumatic piston-cylinder assemblies 55 and 56, respectively. The piston-cylinder assemblies 55 and 56 may be pneumatically operated and of the double acting type so that when the rods 53 and 54 are retracted, the actuators 47 and 48 will be pivoted to rotate the valve members 45 and 46 in a clockwise and counterclockwise direction, respectively, as viewed in FIG. 2.

Such rotation of the valve members transports the resin and polyisocyanate or prepolymer constituents being circulated through the valve block 44 to resin metering port 231 and polyisocyanate or prepolymer metering port 232 shown in FIG. 11. The separated materials are fed into area 236 and eventually reach helical blades such as 234 through the open area 233. It should be understood that the impeller is rotating at a high rate of speed in a range of about 3000 to about 6000 r.p.m. The helical blades 234 convey material downward when drive shaft 63 is rotating in a counterclockwise direction as viewed from the output end in FIGS. 2 and 11. The mixing and shearing action occurs mainly at areas such as 235 where the tolerance between the O.D. of mixing impeller 58, which would coincide with the O.D. of helical blade 234 and the I.D. of impeller housing 60, is very small, usually less than $\frac{1}{32}$ of an inch. Vertical or horizontal grooves can be placed along impeller 58 to improve mixing efficiency. However, the grooves should be spaced so that the impeller will be in balance during rotation. In this manner, the materials are both mixed by shearing action and conveyed via helical grooves 59 to the discharge opening 61 of the impeller housing.

The impeller 58 is mounted on shaft 63 by means of head 237 threaded into tapped aperture 238. Shaft 63 extends upwardly through the valve block 44. A thrust bushing will be provided for such shaft in the valve block and high speed precision bearings mount such shaft at the opposite ends of spacing sleeve 64 which is firmly held between support plate 65 and the top of the block 44 of the mixing valve 35 by tie rods 66. The impeller shaft 63 is connected by means of flexible coupling 67 to shaft 68 of drive motor 69 secured by mounting plate 70 to the support plate 71 on the distal end of the frame 2. The motor 69 will serve to drive the impeller 58 at high speed in a counterclockwise direction as viewed from the output end thereof. The amount of foamable resin reaction mixture which will be dispensed through the opening 61 when pumps 27 and 28 are metering at constant rates can closely be controlled by the duration which the piston-cylinder assemblies 55 and 56 maintain the valve members 45 and 46 in their dispensing positions.

The dispensing head then takes the constituents from the tanks 23 and 24 at the precisely maintained temperature, which are maintained segregated from each other in the separate circulating systems, and intermixes such constituents while simultaneously dispensing a precise amount thereof through the opening 61 of the impeller tube. The resin reaction mixture, however, constitutes only one of the basic constituents of the abrading or grinding tool which is produced by the present invention.

The other basic constituent of the tool is the granular abrasive material which is contained within the hoppers 20 and 21. The type, grit size, and amount of abrasive employed may be varied to produce a wide variety of types and sizes of grinding wheels. Reference may be had to the aforementioned copending application for a more complete discussion of the types of abrasive materials that may be employed with the apparatus and methods of the present invention. It will, of course, be appreciated that additional materials may be incorporated with the abrasive such as various fillers and additives. In any event, the amount of abrasive added to the reaction mixture of the resin will be carefully weighed so that the amount of abrasive in the finished product is properly determined.

Such granular abrasive material is contained within the hoppers 20 and 21 and since such hoppers are identical in form, only the hopper 20 will be described in detail. Referring now additionally to FIG. 4, the hopper comprises a sheet metal cylindrical container 75 terminating in a frusto-conical recess 77 in the top of a cylindrical valve block 78 having a circular port 79 which communicates with a frusto-conical enlargement 80 in the bottom of the block. The recess 80 communicates with the top of a funnel 81 secured to the bottom of the block 78 and tubing 82 connects the bottom of the funnel 81 with elbow 83. An inclined tube 84 extends from the elbow 83 to adjacent the discharge opening 61 of the impeller tube 60. The tube sections 82 and 84 may, for example, be copper and the elbow 83 may be of a harder wear resistant material to withstand the scoring effect of the abrasive passing therethrough. A mounting sleeve 85 surrounds the block 78 and such may be welded or otherwise suitably secured both to the funnel bottom 76 of the hopper 75 as well as to the block 78.

As seen in FIG. 2, a cylindrical bracket 86 may be secured to the plate 71 on the outer end of the frame 2 by suitable fasteners 87 thus supporting the entire hopper assembly on the frame 2 adjacent the mixing head 1. The top of the cylindrical container 75 is provided with a cover 89 and a seal 90 may be included to provide an air-tight seal between the hopper 75 and cover 90. A valve member 91 of inverted frusto-conical shape is mounted on the lower end of valve operating rod 92 to seal the passage 79 at the bottom end of the hopper. Such valve member 91 may be of polyurethane elastomer, neoprene, rubber, or other elastomeric material effectively to seal the passage 79 when the valve member is in its closed position.

Opening and closing of the valve member may be obtained by a relatively small pneumatic piston-cylinder assembly 93 having its rod 94 connected to the valve operating rod 92. Such piston-cylinder assembly may be of the double acting type and pneumatic lines 95 and 96 are connected thereto and extend through the cover 89 as indicated. The assembly 93 may be mounted on a spider 97 within hopper container 75 and extension of the piston-cylinder assembly 93 will move the valve member 91 vertically downwardly permitting the abrasive material to flow from the hopper through the valve member and down the tubing 82 and the inclined tubing 84 into the funnel 15 adjacent the discharge opening 61 for the resin constituents. The seal 90 and the elastomeric or deformable nature of the valve member 91 permits the application of a slight air pressure within the hopper so that the entire abrasive material, which may contain certain additional fillers, will be discharged quickly and uniformly through the tube 84 into the funnel.

The hopper assembly 21 will be substantially identical in form and the amount of abrasive and additional fillers that may be desired to be placed within the mold for the grinding wheel, hereinafter described, may be carefully mixed and weighed and halved with each half being placed within the respective hopper assemblies 20 and 21. It will, of course, be appreciated that a continuous feed and weighing mechanism may be provided so that the production of grinding wheels may be programmed and produced automatically in fairly rapid sequence. Cut-off plates segregating the weighed separate charges of the abrasive filler material may be provided for a slightly more automated production system.

It can be appreciated that other devices than the twin hopper assembly previously noted can be used to meter abrasive grain and fillers uniformly and accurately to funnel 15. For materials of constant bulk density, "live bin" feeders with a screw or belt feed can be extremely accurate with variations from batch to batch less than one percent. A "live bin" or vibrating rotating hopper in this case ensures a constant bulk density of material to the feed mechanism which can be a variable speed rotating volumetric displacing feed screw or a flexible belt carrying a given height and width of material. Both of these feeder mechanisms give constant volume rates and, since the bulk density can be kept uniform by means of the "live bin," a constant weight rate can be obtained. A device such as this can be used to meter abrasive and/or fillers into funnel 15 for further mixing with the liquid components in a subsequent processing step.

Referring now more particularly to FIGS. 2 and 3, the mold into which the wheel constituents above described are dispensed is shown generally at 100 and comprises top and bottom plates 101 and 102, respectively, separated by a ring 103 with the top and bottom plates and ring being held together in the manner indicated in FIG. 2 by recessed head cap screws 104 equally peripherally spaced about the mold. The interior surfaces of the top and bottom plates 101 and 102 will be accurately dimensioned and may be provided with a special surface finish. Such interior surfaces of the mold also may have applied thereto a silicone mold release agent so that the mold may subsequently be disassembled and the product formed thereby readily stripped therefrom.

The bottom mold plate 102 is provided with a recess 106 which very closely matches the dimensions of mold locating pilot 239. The mold locating pilot centers the mold on the centrifuge table as shown in FIG. 12. A recess 240 in mold locating pilot 239 is of such dimension that it will retain the head 241 of insert 107, shown in FIG. 13, and ensure a rotational speed of insert 107 equivalent to that of the centrifuge table. Insert 107 has centrally located internally tapped apertures 242 and 243. The top mold plate 101 is, of course, provided with a center fill opening indicated at 109.

The mold assembly is mounted on a turntable 111 within the housing 7 which is in turn mounted on turntable drive shaft 112 in turn driven through a speed reducing transmission by a centrifuge or turntable drive motor (not shown). The mold is held to the turntable 111 by a plurality of clamps 114 which include radially inwardly extending projections 115 overlying the top mold plate 101. The clamps, illustrated as four in number and quadrant spaced about the mold, are held in position by elongated cap screws 116 which extend through the clamps and are threaded into tapped holes in the top surface of the turntable 111. A plurality of radially spaced apertures as well as circumferentially spaced apertures may be provided in the turntable 111 so that molds of varying sizes may readily be clamped and mounted thereon.

The top mold plate is provided with three equally circumferentially spaced detent housings 118, 119 and 120 adjacent the opening 109 held to the plate by suitable fasteners 121. As seen in FIG. 2, these housings contain spring loaded detents 122 with the projecting noses of the detents being urged radially inwardly by the springs thereof. These detents 122 serve releasably to engage annular groove 124 (see FIG. 5) or top shoulder 125 in the outside wall of center filling cap 126. The detents are positioned by the housings 118 through 120 to project slightly over the center fill opening 109 of the top mold plate 101 and the center filling cup 126 fits closely within the opening 109.

The interior surface 127 of the center filling cup may be in the form of a right circular cylinder while the outside surface tapers as indicated at 128 on the order of about 2½° from the groove 124 to the bottom edge 129 of the cup. The groove itself may be approximately of a ⅛" radius and about ¹⁄₁₆" deep. The surface 130 above the groove 124 also tapers in the opposite direction as the surface 128 at an angle of approximately 2° and 15' from the groove 124 to the shoulder 125. From the shoulder 125 to the top of the cup, the surface 131 may be concentric with the inner cylindrical surface 127.

It can now be seen that the detents 122 engaging the groove 124 of the cup 126 will hold the cup releasably in an elevated position within the center fill opening 109 of the top mold plate. In this open condition of the mold, a substantial clearance is provided between the bottom edge 129 of the filling cup and the bottom mold plate 102. As illustrated in FIG. 2, the center filling cup is in the mold-open position and the detents releasably hold the cup in such position so that the cup may readily be knocked down or vertically moved downwardly to the mold-closed position illustrated more clearly in FIGS. 7, 8 and 9.

In the mold-closed position, the detents 122 will engage behind the shoulder 125 firmly yet releasably holding the cup closed. In such closed position, venting of the mold may occur beneath the bottom 129 of the cup 126 where it contacts the top surface of the bottom mold plate 102. The center filling cup may be moved to its closed position simply by tapping the top thereof with a hammer or other instrumentality and it will, of course, be appreciated that a mechanism may be provided automatically to lower the cup to close the mold. The cup then becomes a part of the mold confining the grinding wheel constituents therewithin. The mold thus formed then comprises the bottom mold plate 102, the annular ring 103, the top plate 101, and the center filling cup 126.

Mounted in the insert 107 in the recess 240 of the mold locating pilot 239 is a stud 133 having a hub 134 on the top thereof from which project a plurality of radially extending fingers 135. Such fingers 135 may comprise simply threaded headed studs secured in tapped apertures in the cylindrical side wall of the hub 134 and such fingers are both circumferentially and vertically spaced with respect to each other. The ends of the fingers clear the center filling tube 12 since it will be understood that the fingers on the stud 133 will rotate with the mold while the filling tube 12 does not rotate. The fingers 135 constitute rotating mixing fingers which serve intimately to mix and coat the granular abrasive material fed to the tube 12 from the tubes 84 with the liquid resin material which is fed through the discharge end 61 of the impeller tube 60. Since the stud 133 is threaded into the tapped aperture 242 in the insert 107, the stud and the mixing fingers projecting therefrom can readily be inserted and removed from the mold. The threads in tapped aperture 242 and on stud 133 should be such that the rotation of the centrifuge will tend to tighten the connection of these two components.

The valve members 45 and 46 will be actuated by piston-cylinder assemblies 55 and 56, respectively, to cause the resin constituents to mix together and be conveyed by the impeller 58 through the discharge opening 61 of the impeller tube 60. About one or two seconds later, the valve members 91 will be actuated by the piston-cylinder assemblies 93 to release the abrasive in the respective hoppers into the inclined tubes 84 and thus into the funnel 15 leading to the filling tube 12. It is fairly important that the proper amount of abrasive grain be introduced uniformly into the mixing or filling tube 12 in a somewhat shorter length of time than the resin shot. For example, the resin shot time may be approximately 25 seconds and yet the proper amount of abrasive should ordinarily be introduced uniformly in about 20 seconds. The abrasive and resin will then flow downwardly through the tube 12, and in order to enter the mold cavity, must pass through the rotating mixing fingers 135. The turntable 111 will initially be brought up to what may be termed a mixing speed such as about 500 to 900 r.p.m. for a 20" wheel, and it can thus be seen that at such speed, the abrasive grains will be intimately mixed with the resin reactant material and thoroughly coated thereby before it can pass beneath the bottom lip 129 of the filling cup 126 and into the spinning mold.

It should be noted that the hub 134 containing mixing fingers 135 can be driven independently of the centrifuge at mixing speed. For instance, the turntable drive shaft 112 could be hollow as well as the rotational center of turntable 111. Through the hollow shaft and turntable could be fed a drive mechanism such as shaft S which could be coupled to stud 133. Although the design would be slightly different from that shown, it can easily be seen that by properly positioned bearings and seals for rotation and coupling devices for joining stud 133 with the drive mechanisms, the rotating mixing fingers 135 can be driven independently of the centrifuge. A higher speed for mixing the abrasive, filler and liquid components may be desired, especially if the abrasive grain or filler powder is of a very fine mesh size, thus requiring a much greater surface area to be wet out in a given time. In this case, a high rotational speed of mixing fingers 135 would be desired for wetting the dry components and a lower centrifuge speed used for the uniform dispersion of the wetted components to the outer periphery of the wheel. It should be noted that the rotation of the mold at mixing speed also accomplishes the important job of uniformly dispersing the wetted components throughout the mold in a relatively balanced condition. In some cases, such as when the mixing is being done at an independent speed, it would be the only function of the centrifuge fill speed.

After both the abrasive grains and the resin reactant materials have been dispensed and thus mixed, the mixing head 1 may be elevated and shifted away from the funnel 15. The funnel and mixing tube 12 may then be removed while the mold and the mixing fingers 135 are still rotating. The center filling cup 126 may then be tapped with a tool to close the mold causing the detents 122 to engage behind the top shoulder 125 thereof to hold the cup 126 in its lower or mold closing position. The removal of the mixing head and the filling tube as well as the closing of the mold may be accomplished in a matter of a few seconds and when the mold is closed, the full centrifuge speed may now be obtained. For example, the turntable may now be rotated at approximately 1060 r.p.m. for such 20" wheel causing the abrasive grains A, seen in FIG. 7, to concentrate in a rim of uniform radial dimension at the periphery of the mold.

The mold may be heated prior to placement on the turntable 111 to avoid excessive change in temperature for the resin reactant materials and abrasive flowing into the mold through the radially extending mixing fingers 135 and to ensure more uniform cure conditions. Also, the abrasive material itself may be heated somewhat. Ordinarily, the resin and the polyisocyanate or prepolymer will commence reacting as soon as they are brought together in the mixing head. Competing reactions occur simultaneously, the major reactions being between the hydroxyl groups of the resin with the isocyanate groups of the polyisocyanate or propolymer, causing polymer buildup and the reaction of water with the isocyanate groups in the polyisocyanate or prepolymer to form carbon dioxide gas which has the function of "blowing" the foam. Polymer buildup alone would tend to increase the viscosity of the system. However, the heat of reaction, causing an increase in temperature, maintains the blend of liquid components in a fluid state for a reasonable length of time. During this "fluid" state, the abrasive is centrifuged through the liquid media. After the rim of abrasive material A in FIG. 7 is obtained and the viscosity of the material has increased sufficiently to hold the abrasive material in the centrifuged or uniform circumferential position, thereby preventing slump, the bulk of the foaming action occurs. When foaming does occur, during and sometimes after the centrifuging step, the rim of abrasive A will expand or foam back as indicated at B in FIG. 8, and the substantially abrasive free inner portion of the wheel will also expand foaming back completely filling the mold cavity as indicated at C. During the high speed centrifuging operation, the abrasive grains when concentrated in the rim A reach a touching relationship and have a density greater than the normal pack density of the abrasive material. The pack or bulk density of an abrasive grain as determined by ASTM method E153–59T is a measure of how the abrasive grains nest together in a touching relationship after a free fall in a dry condition. The bulk density is a function of the true specific gravity of the grain, grain size and grain shape. For instance, an abrasive containing 98.6% aluminum oxide, marketed as XW by The Exolon Company of Tonawanda, N.Y., has a bulk density of 1.74 to 1.86 grams per cubic centimeter in the 60 grit size. However, in the present situation, the grains are thoroughly coated by the liquid resin material and such coating creates a reduction in the amount of bridging which will occur when these granular materials are piled up because the liquid tends to lubricate the grains and allows them to settle in a considerably closer relationship. Thus, not only do the abrasive grains in the initial narrow rim reach a substantially touching relationship, but the space between the grains is filled with the liquid resin bond. An experiment to simulate the wetted touching condition was made by centrifuging the above XW–60 grit grains through a non-foam thermosetting system such as epoxy system Shell Epon 828, cured with diethylenetriamine and keeping the abrasive rim A in a fixed position by centrifuging until the resin system cured in the mold leaving substantially no cellular spaces or voids in the outer abrasive rim. The resultant wetted abrasive in a touching condition had a density of 1.92 grams per cubic centimeter. The abrasive density of the subject wheel, using XW–60 grit grain can be varied from 1.28 to 1.89 grams per cubic centimeter, depending on the combinations of processing variable used such as centrifuge fill speed and final speed as well as duration of centrifuging, abrasive-to-plastic ratio, volume of contents in mold before foam-back, and others. The preferred range of abrasive density for this particular grit would be from 1.50 to 1.87 grams per cubic centimeter, indicating that approximately 38 to 47.5 percent by volume of the grinding structure is occupied by abrasive in the case of XW–60 grit. It can be seen that even at the maximum density recorded of 1.89 grams per cubic centimeter for the subject wheel, there is some separation of grains compared to the touching wetted grain density of 1.92 grams per cubic centimeter.

Evolution of gas usually occurs some time during the high speed stage of centrifuging. Normally, centrifuging will be stopped some time before the foaming action stops and the reactants reach a stage of gellation. This allows the reactants to foam back against atmospheric conditions and allow a substantial grain separation in the abrasive rim such as shown in B. If it be desired to control the grain separation so that it is relatively small, high speed centrifuging can be continued until foaming action is completed and the reactants are gelled. In the case of high volume abrasive wheels such as 24″ O.D. by 8″ thick, the foaming action is so vigorous that foam-back will occur even against centrifuging pressures and the grains will be slightly spaced apart and the dimensions of the mold will be completed. If the wheel is processed in the preceding manner, many of the gas bubbles formed in the peripheral region will be bled off towards the central region under centrifugal force. However, sufficient bubbles will remain to separate the grains slightly. Thus, the duration and speed of centrifuging in relation to the foaming and polymerization reactions will have considerable effect on the grain spacing of the completed abrasive rim.

The stud 133 of the center mold mixer having been removed from threaded aperture 242, a spanner bar 140 may now be secured in position bridging the filling cup 126. An elongated threaded stud 141 is employed to secure the spanner bar 140 in place, such stud being threaded into the centrally located internally tapped aperture 243 in the insert 107 in the bottom mold plate 102. The stud 141 extends through an aperture in the center of the spanner bar 140 and may include a recessed head cap 142 to which an air tool or the like may readily be applied to tighten the stud to the desired torque. The spanner bar is provided with downwardly projecting legs 143 and 144 on the opposite ends thereof which engage the top mold plate 101 adjacent the center fill opening 109 therein. The spanner bar, thus attached, serves two purposes. As indicated in FIG. 9, the spanner bar may be utilized with lifting fixture 146 to remove the mold from the housing 7 and from the turntable 111 when the clamps 114 are removed. The other function that the spanner bar 140 serves is to exert a substantial force downwardly on the legs 143 and 144 and a force upwardly at the center of the bottom mold plate 102 through the retainer 107. In this manner, the stud 141 will be placed under substantial tension and the spanner bar may actually cause top and bottom mold plates to dish or concave slightly inwardly. This stressing of the mold plates serves to impart a desirable slightly inwardly concave surface to the sides of the finished product without resorting to tapered mold plates. This desirable taper ensures proper relief in plunge grinding operations and allows several wheels to be grouped together without gapping.

The lifting fixture 146 comprises a horizontal bar 148 having legs 149 and 150 which terminate in oppositely inwardly directed projections 151 and 152 which fit beneath the spanner bar 140. An eye 153 is mounted on the top of the bar 148 and the fixture 146 may readily be placed in position and utilized through the eye 153 to elevate the mold from the housing 7 to be positioned in an oven for accelerated subsequent curing of the grinding wheel. Foaming of the resin material may, of course, continue even after the centrifuging has stopped and the mold is removed therefrom. Such foaming, of course, will diminish as the viscosity of the resin increases until the wheel constituents become stabilized. It will, of course, be appreciated that the wheel may be cured at room temperature. but oven curing accelerates the production time of the wheel and improves the properties of the cured system as far as heat resistance, chemical resistance and strength are concerned. After the wheel is cured, the mold may readily be disassembled and the wheel stripped therefrom by removing the cap screws 104 about the periphery thereof.

The finished wheel, shown in FIG. 10, then comprises an outer annulus of concentrated yet slightly spaced abrasive material B, such abrasive being coated and interconnected by webs or membranes of the resin material and an inner substantially abrasive free zone of the foamed resin material C. The center of the wheel may be cored to provide an opening 160 therein and it will be seen that the employment of the center filling cup 123 substantially reduces the amount of waste resin material which must be removed in order to provide the accurately positioned and dimensioned center opening 160. The wheel is then dressed and packaged for shipment.

Referring now to FIG. 6, there is illustrated a schematic wiring diagram which may serve more clearly to delineate the various steps in the production of the grinding wheel. Control circuit mains 162 and 163 may be provided having a 115 volt, A.C. current between which the various functioning relays are provided. The first relay is emergency stop relay 164 which may be controlled by a push button 165 and a limit switch 166, the latter being closed when the cover 8 is closed and clamped in position. Thus the emergency stop relay 164 may be deenergized either manually through the switch 165 or automatically if the cover 8 is opened. A mode selector switch 167 is operative selectively to energize mode manual relay 168, semiautomatic relay 169, or fully automatic relay 170. In this manner, the wheel production cycle may proceed manually, semi-automatically or completely automatically.

To close the cover 8, relay 172 may be energized by push button 173 and conversely, the relay 174 may be energized to open the cover through push button 175. Holding switches 176 and 177 may be closed by the relays 172 and 174, respectively.

In operation, the mold of the desired size will be placed upon the turntable 111, the center filling cup will then be positioned in the open position in the fill opening 109, and the cover will then be closed through the energization of the relay 172. The fill tube 12 as well as the funnel 15 will then be manually inserted in the opening 11 of the cover 8 and the mixing head 1 will be properly positioned above the funnel 15. The hoppers 20 and 21 will be filled with the prescribed amount of abrasive or filler materials. The turntable 111 will now be brought up to the fill speed by energization of relay 178 through push button 179. Such relay 178 will thus be energized through a normally closed stop push button 180 and switch 181 which is closed by the emergency stop relay 164. The fill speed start relay 178 closes switches 183 and 184 with the former energizing fill speed run relay 185 through now closed switch 186 which may be closed by the mode manual relay 168.

The switch 184 energizes the motor drive relay 187 through switch 188 which may be closed by the emergency stop relay 164. The motor drive relay may be connected to the mains 189 and 190 which may provide 240 volt direct current.

The fill speed run relay 185 closes switch 192 in parallel with the switch 183. The push button 179 which energizes the fill speed start relay 178 also serves to energize the fill speed timer 193 through mode selector switches 194 and 195. The timer 193 includes a clutch solenoid 196 and a timer drive motor 197 which are immediately energized. The clutch solenoid 196 also serves to close switches 198 and 199 to energize timer relay 200. The relay 200 closes transiently switch 201 approximately one second before the expiration of the set cycle time. This energizes relay 202 which will close switch 203 if the mode switch 204 is closed. The closing of switch 203 then energizes run speed start relay 205 immediately by by-passing the manual push button 206. The run speed start relay 205 closes switches 207 and 208, the former energizing run speed run relay 209 immediately to bring the turntable 111 up to the centrifuge speed. It will, of course, be appreciated that the fill speed timer 193 may serve simply to stop the drive motor and the run or centrifuge speed may be obtained manually through the push button 206.

The run speed run relay 209 closes switch 210 by-passing switch 207 and at the same time that the run speed start relay 205 is energized, the run speed timer 211 is energized through mode selector switches 212 and 213. The timer 211 includes a clutch solenoid 215 and a timer drive motor 216 with the clutch solenoid 215 also actuating switches 217 and 218 to energize fill speed timer relay 219. The relay 219, when energized, will deenergize the motor drive switches bringing the turntable to a stop.

A brake coil relay 220 is actuated by a switch 221 which may be controlled through the motor drive relay 187. The relay 220 controls switches 222 and 223 which are in series with shunt brake coil 224. A manual jog push button 225 may be employed to control jog relay 226 which in turn controls normally open switch 227 in the motor drive circuit and switches 228 and 229, normally closed, in the circuits of the fill speed run relay 185 and the run speed run relay 209.

It can now be seen that with the mode selector switch 167, the wheel production cycle may be run in a completely automatic manner with the turntable 111 first being brought up to fill speed and then automatically to run speed at the completion of the interval set by the timer 193. Also, the duration of the run speed may accurately be controlled by the setting of the timer 211. Alternatively, the turntable may be halted at the end of the fill speed and the run speed may be manually obtained by the push button 206. It will be appreciated that the period during which the wheel is halted between the fill and run speed portions of the cycle may also be controlled through the use of a timer in a manner similar to the controlled duration of the fill and run portions of the cycle.

OPERATION

Reviewing now briefly the cycle of operation in the production of the grinding wheels, the plumbing apparatus illustrated schematically in FIG. 1 will be placed into operation so that the resin and polyisocyanate or prepolymer, each containing such additives or fillers as previously described, will be circulating through the mixing head valve 35 at the prescribed temperature which will maintain the viscosity in a proper liquid state. Heating control unit 230 and chiller unit 30 maintain the resin and polyisocyanate or prepolymer components at the desired uniform temperatures. Also, the chiller unit may maintain the low temperature desired in case a fluorocarbon is used as a blowing agent. The amount of abrasive to be introduced into the wheel as well as the additional fillers and the like may then be placed in the hoppers 20 and 21 with the valves therein closed. The cover 8 of the centrifuge housing 7 will be opened and a specially prepared and possibly heated mold will be centrally located on mold locating pilot 239 with insert 107 locked securely in recess 240. The mold may then be secured to the top of the turntable 111 through the use of the clamps 114. The bottom mold plate 102 will contain insert 107 into which is threaded the centrally upstanding mixing stud 133 which has the radially projecting fingers 135 on the hub 134. Pneumatically operated wrenches or the like may be employed quickly to secure the mold on the turntable. The size of the mold will, of course, determine the size of the wheel produced.

The center filling cup 126 is positioned in place in the open position with the detents 122 engaging the groove 124. The cover 8 may now be closed by actuation of the push button 173 and the fill tube and funnel assembly may now be positioned through the center opening 11 in the cover 8. Actuation of the piston-cylinder assembly 5 will position the tubes 84 as well as the impeller tube 60 in the proper position over the funnel 15. The fill speed start push button 179 may now be employed to bring the centrifuge and the rotating mold up to the aforementioned fill speed. As soon as the fill speed is obtained, the pneumatic piston-cylinder assemblies 55 and 56 may be actuated and held open for a predetermined time to supply from the mixing valve 35 the reactant resin constituents which will be conveyed by the impeller 58 downwardly through the impeller tube 60 to be discharged through the opening 61 into the funnel 15. Shortly after the resin shot commences, e.g. from about 1 to about 5 seconds, the piston-cylinder assemblies 93 in the hoppers 20 and 21 may be extended opening the valves permitting the abrasive and filler materials to flow through the tubes 84 also into the funnel to flow downwardly with the resin constituents through the fill tube 12. The abrasive itself may also be preheated to control more closely the viscosity and foaming which will take place in the resin wheel constituents.

All of the abrasive material will normally be dumped or forced into the tube 12 prior to the end of the resin shot and it can be seen that the fingers 135 rotating at the fill speed r.p.m. of the turntable will cause the abrasive and resin intimately to mix together and the abrasive grains thoroughly to be coated by the liquid resin mixture. As previously noted, the mixing fingers can be driven independently of the centrifuge and, in this case, the sole purpose of the centrifuge fill speed would be to distribute the wetted abrasive plastic mix in a relatively balanced condition throughout the mold. Such wetted mixture then flows outwardly due to the centrifugal force beneath the lip 129 of the filling cup and into the mold in a relatively even distribution. When the shot is complete, the mixing head 1 may be elevated and swung aside and the fill tube 12 and funnel 15 may be removed from the opening 11 of the cover 8. The center filling cup 126 may then be knocked down so that the detents 122 will engage the shoulder 125 holding the center filling cup in its lowermost position or in the mold closing position. Such closing of the mold may thus be accomplished "on the fly." Also, the stud 133 may be removed from the mold insert 107.

The centrifuge table 111 will have now increased its speed from the fill speed to the run speed and such speed will be maintained by means of the run timer 211. During this period, the abrasive grains are concentrated in rim A as indicated in FIG. 7. Depending upon the grain spacing desired, the centrifuging may or may not be stopped before the bulk of the foaming reaction occurs. In either case, turntable 111 is eventually stopped and the spanner bar 140 positioned by means of the stud 141. Either during or after the final centrifuging, the abrasive rim A will have expanded to a spaced apart relationship indicated at B and the foaming reactants will have completed the dimensions of the mold before gellation of the polymer has occurred. The mold may be removed from the centrifuge table by the fixture 146 indicated in FIG. 9. It then may be positioned in an oven or the like to hasten the curing time of the thermosetting resin. The mold may be placed in an oven for from about 1 hour to about 10 hours at a temperature of from about 150° F. to about 300° F. depending upon the size and type of wheel produced. The mold will then be removed from the oven, usually allowed to cool to room temperature, and the wheel stripped from the mold as it is disassambled. The mold parts will then be cleaned and coated again with a silicone release agent for reuse in the above described process. The finished wheel, illustrated in FIG. 10, will be cored by a boring bar, or other suitable tool as indicated at 160, dressed, and then packed for shipment.

It can now be seen that the internal mold mixing of the resin and abrasive ingredients of the wheel enables the mixing and handling of large quantities of grinding wheel raw materials in a very short time. This simple, yet effective mixing of the ingredients obtains substantial labor savings eliminating manual mixing and reduces substantially the processing time. Moreover, it enables the use of the present high speed process to be employed in the production of very large wheels such as 24″ O.D. x 8″ thick wheels. It may be noted that it would not be possible to manually mix the constituents necessary to make such a large wheel in the short time dictated by the reaction kinetics. It may be appreciated that a large batch of mixed reactants will have a much shorter working life than a smaller batch of identical reactants. Further, such internal mold mixing provides a wheel of improved uniformity by obtaining the proper mixing at the desired point in the process which is prior to the centrifuging distribution of the grains about the periphery of the mold as indicated in FIG. 7.

The advantages of the center filling cup 126 are that a substantial amount of raw material may be saved in the coring of the wheels and especially in the larger diameter wheels. For example, a large diameter wheel may be cored to approximately 8″ and thus an 8″ diameter portion of raw material without a center filling cup is removed. The center filling cup also permits the mold to be plugged or closed "on the fly," thus losing no time in the operation which is very important with large volume highly reactive mixes. Moreover, with the employment of special finishes on the mold plates and the use of silicone mold release agents, mold release problems are substantially eliminated and scrap losses and time consumption in cleaning the molds are materially reduced. With the present invention, the labor involved per wheel in the most critical processing area of mixing, distribution and centrifuging has been reduced to less than one-third of that involved in using manual methods, thus effecting substantial economies in grinding wheel production while still obtaining an accurately balanced, precision grinding wheel capable of abrasive machining.

Although the illustrated apparatus and method are for the resin and polyisocyanate or prepolymer system of a polyurethane wheel of foamed structure, it will readily be appreciated that the features of the apparatus and method may be employed in the production of grinding wheels from any suitable resin and especially thermosetting plastic compositions may be utilized; for example: the reaction products of a member selected from the group consisting of a polyether and a polyester with a polyisocyanate, certain epoxy resin compositions, certain phenolic resin compositions, and certain silicone resins. In general, for grinding wheels and the like in accordance with the present invention which will produce deep accurate cuts at high feed pressure, a cross-linked polymer or thermosetting resin is preferred which will produce a rigid infusible dimensionally stable foam. Also, it will be appreciated that various fillers and additives may be incorporated with the abrasive material or in the liquid media for introduction into the mold.

The relationship of dry bulk density versus wetted bulk density in a touching state after a centrifuging process has been previously noted for XW-60 grit abrasive. Since this relationship exists, it can be seen that the various types of abrasive grains, encompassing a true density range of from about 2.5 to about 4.0 grams per cubic centimeter, grain shapes from very blocky to extremely sharp, and grain sizes from 20 grit to 120 grit, will have a wide variety of packing densities in the wetted state. It may be more suitable, therefore, to describe the composition of region B in ranges of volumetric percentages instead of percentages based on weight. The object is, of course, to maintain at least a slight separation of grain from the wetted bulk density in a touching state as previously described. The volumetric percentage of abrasive in rim B may range from about 33% to about 50% and, preferably from about 38% to about 48%. Fillers may comprise from 0% to about 6% by volume of region B, the preferred range being from 0% to about 4%. The volume percent of bond may range from about 34% to about 50%, the preferred range being from about 38% to about 48%.

The total volume of cells or voids needed to induce the desired grain separation in region B is in the range of from about 1% to 33% and it is this amount that produces the cell-like voids ranging in size from about .001″ to about .016″ diameter in the finished product. A more specific range can be utilized such as from about 2% to about 18% by volume of cells or voids.

It can now be seen that there is provided apparatus for producing in a very short time grinding wheels capable of abrasive machining such as more fully disclosed in the aforementioned copending application.

Other modes of applying the principles of the invention may be employed, change being made as regards the details described, provided the features stated in any of the following claims or the equivalent of such be employed.

We, therefore, particularly point out and distinctly claim as our invention:

1. Apparatus for making a resin bonded abrasive wheel comprising a resin mixing and dispensing head, a rotatable circular mold positioned therebeneath, drive means operative to rotate said omld, an abrasive dispenser mounted on said head, a fill passageway between said head and mold, and a mixer in the lower end of said fill passageway mounted on said mold and rotatable therewith operative to mix said resin and abrasive before entry into said rotating mold.

2. Apparatus as set forth in claim 1 wherein said resin mixing and dispensing head includes a downwardly projecting impeller surrounded by an impeller tube, and two abrasive dispensers mounted on said head on each side thereof with each dispenser including a downwardly directed inclined tube extending adjacent the discharged end of said impeller tube.

3. Apparatus as set forth in claim 2 wherein each abrasive dispenser comprises a cylindrical hopper terminating in a funnel bottom, valve means in said funnel bottom operative to open and close said hopper to discharge such abrasive.

4. Apparatus as set forth in claim 3 wherein said valve means includes a resilient element operative pneumatically to seal said hopper in the closed position.

5. Apparatus as set forth in claim 4 including a small piston-cylinder assembly in said hopper operative to open and close said valve means.

6. Apparatus as set forth in claim 1 wherein the mold comprises top and bottom mold plates separated by a peripheral ring, said mixer comprising radially extending fingers mounted centrally of said mold.

7. Apparatus as set forth in claim 1 including a housing for said mold, and a movable cover for said housing operable to open and close said housing to obtain access to said rotatable mold, said fill passageway including a funnel and fill tube assembly mounted in said opening and extending into said mold to guide such resin and abrasive from said head to said mold.

8. Apparatus as set forth in claim 1 wherein said mixer comprises a centrally disposed upstanding stud mounted on the bottom of said mold and having radially directed mixing fingers thereon, a housing for said mold, a movable cover for said housing, and a fill opening in said cover, said fill passageway including a funnel and fill tube assembly mounted in said opening and extending downwardly into said mold and telescoping closely over said mixer.

9. Apparatus as set forth in claim 1 wherein said mold comprises top and bottom mold plates with a center fill opening in said top mold plate, and a center filling cup mounted in said fill opening adapted to be vertically shifted to close said mold, said fill passageway including a center fill tube extending into said mold concentrically with said filling cup and fitting closely over said mixer whereby ingredients entering said mold through said filling tube must pass through said mixer to enter said mold.

10. Apparatus for making a resin bonded abrasive wheel comprising a rotatable circular mold, drive means operative to rotate said mold, a center axially extending fill opening in said mold, a cylindrical filling cup mounted in said fill opening, means releasably holding said filling cup in an elevated position to permit filling of said mold, and means releasably holding said cup in a lowered position to close said mold after being filled.

11. Apparatus as set forth in claim 10 wherein said means releasably holding said filling cup in an elevated position comprises an annular groove on the exterior of said filling cup, and detent means on said mold adjacent said fill opening.

12. Apparatus as set forth in claim 11 wherein said means releasably to hold said cup in a lowered position comprises an annular shoulder on the exterior of said cup above said groove operative to engage said detent means.

13. A rotatable circular mold for the production of grinding wheels and the like including a centrally disposed axially extending fill opening, a cylindrical filling cup mounted in said fill opening, and means releasably holding said cup in axially shifted positions, one of said positions closing said mold.

14. A rotatable circular mold for the production of grinding wheels and the like comprising a bottom annular mold plate, a peripheral spacing ring, and a top annular mold plate concentric therewith, a center fill opening in said top annular mold plate, a mold closure member mounted in said fill opening for axial movement from a mold opening to a mold closing position.

15. A center filling cup for an annular rotatable mold adapted to be positioned in an axially extending fill opening thereof comprising a cylindrical sleeve having a right circular cylindrical inner surface, and an outer surface including a lower downwardly tapering portion having an annular detent groove at the top thereof, an upwardly tapering portion extending above said groove and terminating in a shoulder, and a right circular cylindrical surface extending from said shoulder to the top of said cup.

16. A mold for the production of grinding wheels and the like comprising an annular bottom mold plate, a peripheral ring supported on said bottom mold plate, a top mold plate supported on said ring and concentric with said bottom mold plate and said ring, an axially extending fill opening in said top mold plate, a spanner bar engaging said top mold plate on the opposite sides of said fill opening, and means securing said spanner bar to the bottom mold plate operative to exert an axial force on said spanner bar thus to urge said mold plates centrally toward each other.

17. A mold as set forth in claim 16 wherein said last mentioned means comprises a headed stud projecting centrally through said spanner bar and threaded into a centrally located tapped aperture in the bottom of said mold.

18. A mold as set forth in claim 16 including a center closing cup mounted in the fill opening in said top mold plate and engaging said bottom mold plate to provide an annular mold having a substantial open center core.

19. Apparatus for production of grinding wheels and the like comprising a rotatable annular mold, a center fill opening in said mold, a mixing tube projecting into said fill opening, means to introduce a liquid thermosetting resin into said mixing tube, and means to introduce an abrasive material into said mixing tube during the introduction of said resin, means at the bottom of said mixing tube operative intimately to mix said resin and abrasive, and means to cause said mixture to flow radially outwardly into said mold.

20. Apparatus as set forth in claim 19 wherein said means to mix said resin and abrasive comprises a mixer mounted on the bottom of said mold projecting into said mixing tube.

21. Apparatus as set forth in claim 20 wherein said mixer comprises a removable stud threaded into an insert mounted in the bottom of said mold and including radially projecting fingers mounted thereon and telescoped within said mixing tube.

22. Apparatus for making grinding wheels and the like comprising an annular mold, a filling passageway for said annular mold, means operative to dispense a liquid resin and an abrasive into said filling passageway, and a rotary mixer in said filling passageway operative to mix said abrasive and resin before entry into said mold.

23. Apparatus as set forth in claim 22 including means operative to rotate said annular mold, and means to rotate said mixer at a speed different from that of said mold.

24. Apparatus as set forth in claim 22 wherein said rotary mixer comprises a plurality of radially extending mixing fingers in the discharge end of said filling passageway operative to sweep the discharge opening thereof.

25. Apparatus as set forth in claim 22 wherein said rotary mixer includes a plurality of radially extending mixing elements operative to sweep the discharge end of said passageway to impede the flow of resin and afford ample time in the filling of said mold for the mixing of said resin and abrasive.

26. Apparatus as set forth in claim 22 wherein said mixer is mounted on a stud projecting from the bottom of said mold and includes a plurality of radially extending mixing elements sweeping the discharge end of said filling passageway.

References Cited

UNITED STATES PATENTS

| | | | |
|---|---|---|---|
| 1,944,460 | 1/1934 | Pike | 164—286 |
| 2,172,798 | 9/1939 | Littmann | 164—302 |
| 3,129,269 | 4/1964 | Charvat | 264—311 X |
| 3,217,691 | 11/1965 | Jablonski | 18—5 |
| 3,253,068 | 5/1966 | Whittington | 18—26 |
| 3,290,423 | 12/1966 | Hatch et al. | 264—311 X |

FOREIGN PATENTS

| | | |
|---|---|---|
| 123,900 | 7/1931 | Austria. |

WILBUR L. McBAY, *Primary Examiner.*